BROADBAND TUNER

Filed Jan. 10, 1958 2 Sheets-Sheet 1

INVENTOR:
Paul W. Crapuchettes

By Robert H. Lentz
Attorney

Sept. 29, 1959 P. W. CRAPUCHETTES 2,906,920

BROADBAND TUNER

Filed Jan. 10, 1958 2 Sheets-Sheet 2

INVENTOR:
Paul W. Crapuchettes

By Robert H. Fertz
Attorney

United States Patent Office 2,906,920
Patented Sept. 29, 1959

2,906,920

BROADBAND TUNER

Paul W. Crapuchettes, Atherton, Calif., assignor to Litton Industries of California, Beverly Hills, Calif.

Application January 10, 1958, Serial No. 708,281

6 Claims. (Cl. 315—39.61)

This invention relates generally to an improved broadband tuner and more particularly to a broadband tuner for multi-cavity resonator magnetrons wherein an improved form of contacting tuning plunger is inserted in each of the resonators to effect the tuning thereof.

This invention constitutes an improvement over the copending U.S. patent application Serial Number 430,759, filed May 19, 1954, by P. W. Crapuchettes entitled, "Magnetron Tuner," now Patent 2,832,006 issued April 22, 1958, wherein there is disclosed a magnetron tuner which functions to extend the tuning range of a magnetron, especially in the lower end of its frequency range, by increasing the inductive tuning effects. As therein disclosed, each of the cavity resonators in the anode of a multicavity magnetron is formed by radial walls, and an outer cylindrical wall which is curved or grooved to meet in contiguous surface relationship with the corresponding radial wall surfaces, the curved outer wall being utilized to receive an associated tuning plunger, preferably formed of tungsten, which has a radius smaller than the radius of curvature of the outer wall and which is in sliding contact therewith. Although the tuning plungers disclosed in the above described copending application may be circular in cross-sectional configuration, it has been found that plungers whose cross-sectional configuration is oval or elongated provide a substantially greater tuning range owing to the fact that a greater portion of the inductive region of the resonators is affected by insertion of the plunger.

Notwithstanding the advantages offered by oval shaped or elongated tuning plungers, in practice it has been found that there are several distinct disadvantages attendant their use, these disadvantages being caused primarily by limitations in the physical properties of tungsten, the material from which the plungers are preferably constructed because of its ability to withstand high temperatures and retain its flexibility. More specifically, it is relatively well known that although tungsten may be readily formed as rods having a circular cross-section, it is very difficult if not impossible to shape this material into certain forms by drawing, rolling or machining while also maintaining the original physical properties of the material. For example, it has been desirable to produce solid oval tungsten plungers which have appreciable flexibility; however, this has been difficult to achieve in the plungers described in the above-referenced copending application because the convention metal-working processes create changes in the physical properties of the tungsten plungers, thereby producing phenomena such as brittleness, warpage, and surfaces which gall with the copper surface of the anode block, and there are no economically feasible methods available to restore the original or desired properties. Consequently, while the use of tungsten for tuning plungers is desirable for greater tuning range and from the standpoint that tungsten is capable of being used in a vacuum at very high temperatures while maintaining its flexibility, the tuners are difficult and costly to construct, and are often less durable and reliable than conventional high speed tuners. This has been found to be especially true when the tuners are used with very rapid multi-cycle hydraulic tuners, where the plungers tend to break off or cause extensive wear on the back wall of the cavity because of their uneven surface and tendency to gall, thereby appreciably decreasing the life expectancy of tubes in which they are employed.

The present invention, while employing the same basic principles set forth in the aforementioned copending application, overcomes the foregoing problems and provides improved tuning plungers which are easier to construct, cheaper to produce and provide greater durability and reliability than the plungers of the prior art. In accordance with the basic concept of the invention, the desired tuner configuration is achieved by fabricating the tuning plungers from a relatively thin tungsten rod to which a copper flag is connected as by brazing. As herein utilized, the term flag describes a piece of metal, made of a conductive metal such as copper, whose horizontal cross-section with respect to the axis of the magnetron has one dimension greater than the other where the greater dimension extends in a direction radial to the axis of the magnetron when the flag is affixed to its tungsten rod and is placed within one of the cavity resonators.

As set forth in more detail herein below, commercially available tungsten rods of circular cross-section may be ground and polished to the suitable surface smoothness, and the copper flags may be fabricated very readily by rolling, drawing or machining to any one of numerous suitable configurations. Still other features provided by the improved tuning plungers of the invention are the improved mechanical flexibility and surface smoothness of the tungsten rods, both of which contribute to greatly increased efficiency and enable the tuning plungers to withstand many millions of tuning cycles with extreme rapidity.

It is therefore an object of the present invention to provide improved broadband tuning plungers for tuning multi-cavity magnetrons.

Another object of this invention is to provide a broadband magnetron tuner which employs tuning plungers contacting the walls of the cavity resonators and which is capable of operating through millions of tuning cycles.

Still another object of the present invention is the provision of an improved magnetron tuner which provides improved mechanical and electrical operation concomitantly wtih increased tuning range.

The novel features which are believed to be characteristic of the invention, both as to its organization and method of operation, together with further objects and advantages thereof, will be better understood from the following description considered in connection with the accompanying drawings in which several embodiments of the invention are illustrated by way of example. It is to be expressly understood, however, that the drawings are for the purpose of illustration and description only, and are not intended as a definition of the limits of the invention.

Figure 1:
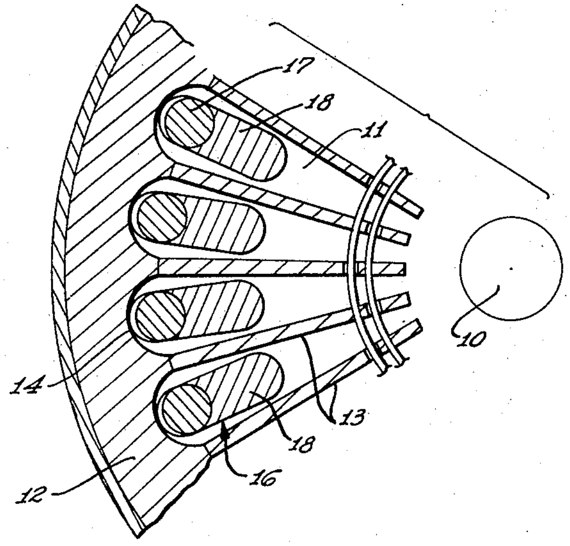
Figure 1 is a fragmentary plan view, partly in section, of a multicavity magnetron illustrating one form of improved tuner configuration employed in accordance with the invention.

Referring now to the drawings, wherein the same reference characters designate like or corresponding parts throughout the several views, there is shown in Figure 1 a portion of a multi-cavity magnetron which employs a broadband tuner constructed in accordance with the teachings of the invention, for varying the frequency of operation thereof by varying the effective inductive reactance of the cavity resonators. As shown in Figure 1 a plurality of cavity resonators 11 extending radially inward toward a cathode 10 are formed by a conventional cylindrical anode block 12 and a plurality of regularly spaced vanes 13 which project radially inward therefrom, each of the regions of the anode block 12 between adjacent vanes being cylindrically grooved, as illustrated by the groove designated 14. In accordance with the present invention, the tuner comprises three basic elements, namely, a plurality of tuning plungers 16 tangentially grounded against anode block 12 within grooves 14, each tuning plunger comprising a tungsten rod 17 and an associated flag 18 affixed thereto, and a tuning ring not shown in Fig. 1, for interconnecting the tuning plungers to permit their insertion into or withdrawal from their associated cavity resonators in unison.

Turning now to the specific elements of the broadband tuner of the invention, the radius of curvature for the grooves in the anode block is determined by the size of tuning rods 17, the radius of the rod being slightly smaller than the radius of curvature of the grooves 14 so that contact is made between the tuning plungers and the anode block over an area which becomes relatively large after a relatively small amount of break-in wear. As shown in the drawing, plungers 16 are each positioned to make tangential sliding contact with cylindrical block 12 substantially at the center of the corresponding groove in the anode block, or stated in an alternative manner, the plungers and block are slidably interconnected with the plungers substantially parallel with the wall of the anode block.

Figure 2:
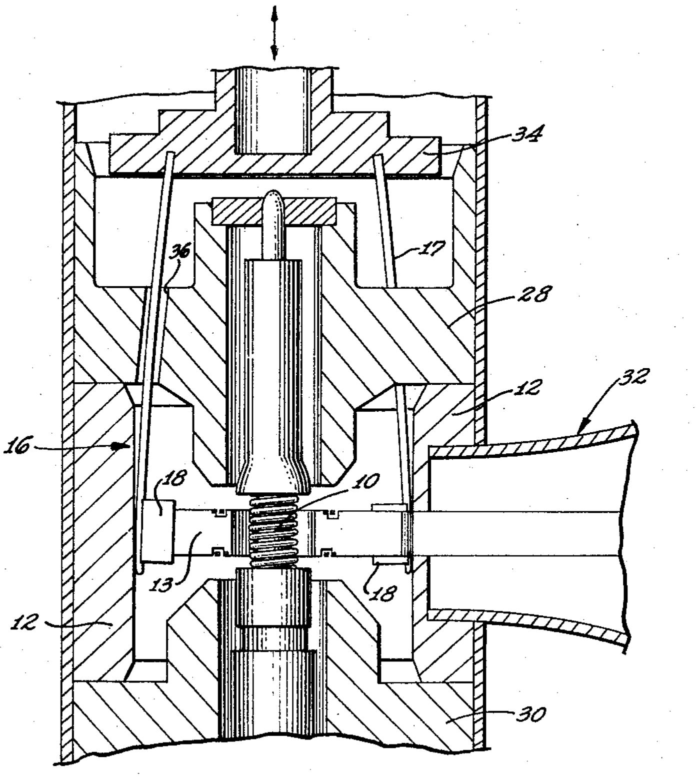
Figure 2 is a side view of the magnetron of Figure 1, partly in section illustrating the manner in which the tuning plungers make tangential contact within the outer cylindrical anode body wall.

Referring now to Figure 2 there is shown a side view of the magnetron of Figure 1 illustrating the general position of the basic elements of the invention, and more specifically the manner in which the outer cylindrical wall 12 containing groove 14 is tangentially grounded by tuning plungers 16, only two tuning plungers being shown in this view for purposes of clarity. As shown in Figure 2, the magnetron of this particular embodiment of the invention further includes a pair of magnetic pole pieces 28 and 30 which are disposed within the vacuum envelope on opposite sides of the anode block for channeling an externally applied magnetic field through the magnetron interaction space and cavity resonators, and a horn type output structure 32, only a portion of which is shown, for extracting electrical output energy from the magnetrons resonant system.

It will be recalled from the description of Figure 1 that the novel tuning mechanism of the invention included a third element for moving the tuning plungers in unison. As shown in Figure 2 this function is performed by a tuning ring 34 to which the remote ends of tungsten rods 17 are affixed, the tuning ring being axially movable through the use of an associated bellows unit, not shown, to permit axial movement of the tuning plungers either into or away from their associated cavities. It should also be noted at this point that the use of a tuning ring relatively remote from the magnetron's anode structure is enabled by passing the tuning plunger rods through a corresponding plurality of elongated apertures which are formed in the upper pole piece, as viewed in Figure 2, only one of these apertures, designated 36, being visible.

Consider now the detailed structure of the novel tuning mechanism of the invention. The tungsten tuning plunger rods are formed of highly polished and relatively slender round tungsten rod so that the length of each tuning rod is many times that of its diameter. The conductive flags 18, which are preferably formed of oxygen free copper, are affixed to lower end of the tuning rods, as viewed in Figure 2, as by brazing with a nickel-copper-gold brazing alloy.

In a similar manner, the opposite ends of the tuning rods are brazed or otherwise affixed to tuning ring 34. It is important to note at this point that the tungsten tuning rods, which are normally straight metallic rods, are mounted in the tuning ring at a preselected angle with the plane thereof so that during the construction of the tuner the circle defined by the flagged ends of the tuning rods has a diameter larger than the inner diameter of the anode block. Accordingly, the magnetron is assembled by compressing the plungers and positioning them in their respective grooves in the anode block, after which the pressure is removed and the plungers are forced into contact with the backs of their respective cavity resonators by the inherent resiliency of the tungsten rods.

As shown in Figure 2, after assembly each tuning plunger is substantially parallel with the back of its cavity resonator, the rods being flexed or bent throughout most of their length to provide a relatively constant spring pressure which maintains the contact between the plungers and the anode block. It should be noted at this point that the elongated apertures in pole piece 28 through which the tuning rods pass have a slope with respect to the tube axis which is substantially the same as the average slope of the tuning rods, this slope in practical tube embodiments which have been constructed being of the order of .035 to .060 of an inch per lineal inch parallel to the tube axis.

Consider now the advantages which are provided by the novel tuner assembly of the invention. Owing to the inherent properties of polished tungsten rod, such as the excellent crystal properties of its outer surface, the tuning rods will retain their flexibility and shape at the very high baking temperatures encountered in exhausting the tubes in which they are used, and are also unaffected by the relatively high operating temperatures to which they are subjected when the tube is placed in operation. In addition, the use of relatively slender tungsten rods in combination with conductive flags extending radially over substantially all of the inductive portion of the cavity resonators enables one to achieve a materially increased tuning range while simultaneously providing a relatively constant spring force between each plunger and the back of its cavity resonator, the magnitude of this force being substantially independent of wear. Finally, the use of highly polished tungsten tuning rods inhibits wear on the back surface of the cavity resonators, and materially reduces the frictional forces which would otherwise oppose insertion and withdrawal of the tuning plungers from the magnetron's resonant system.

Figure 3:
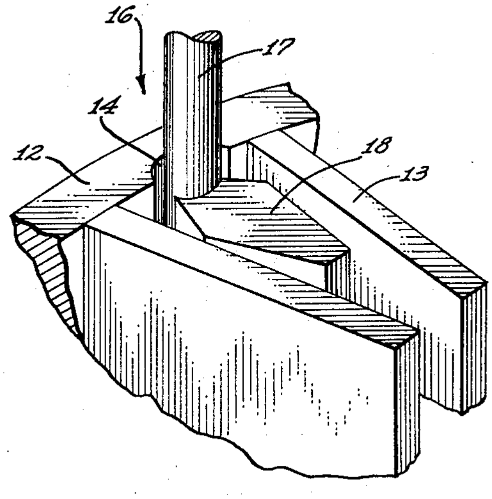
Figure 3 is a fragmentary isometric view of an alternative form of tuning plunger and flag configuration, according to the invention, and illustrates the relationship of the tuning elements to the cavity resonators.

Referring now to Figure 3 there is shown an enlarged fragmentary diagrammatic view of a magnetron cavity resonator and tuning plunger illustrating an alternative embodiment of the invention exemplifying how the teachings of the invention may be utilized at lower frequencies, where a larger cavity resonator volume is required. More particularly, there is again shown a conventional anode block 12, with grooves 14 cut therein and vanes 13 connected thereto and extending radially therefrom. However, particular attention is called to the fact that the grooves 14 differ from those shown in Figure 1 in that they are not contiguous with vanes 13, but are instead formed in the middle of the back wall of the cavity resonators to permit the tuning plungers 16 to again employ relatively slender tungsten rods 17. As further shown in Figure 3, the configuration and size of the conductive flags 18 relative to the size of rods 17 is selected to accommodate the larger cavity resonators and thereby again provide a relatively broad tuning range at the lower operating frequency, concomitantly with the other electrical and mechanical advantages attributable to the use of tungsten rods, as described hereinabove with respect to Figures 1 and 2.

The basic concepts set forth herein have been utilized in actual magnetrons in which the diameter of curvature of the grooves have been within the range of .025 to .050 inch and the diameter of the rods were within the range of .020 to .040 inch. Within these ranges of construction, tubes have been produced which are tunable over ranges as large as from 4800 megacycles to 6800 megacycles, and from 8700 megacycles to 10,500 megacycles, with no significant variation in the operating efficiency and frequency stability of the magnetrons and without experiencing any deficiency in mechanical characteristics during millions of tuning cycles.

While the broadband tuner of the invention has been described with reference to several particular embodiments, it will be understood that various modifications could be made in the construction thereof without departing from the spirit and scope of the invention. Accordingly, it is expressly understood that the foregoing description shall be interpreted only as illustrative of the invention, and that the appended claims be accorded as broad an interpretation as is consistent with the basic concepts herein taught.

What is claimed as new is:

1. In an inductively tunable multi-cavity magnetron, the combination comprising: a cathode having an axis; an anode surrounding said cathode and forming a plurality of cavity resonators evenly spaced around and extending radially inward toward said cathode, each resonator being formed by a pair of vanes and a back wall remote from said cathode, said back wall of said resonators being grooved in a direction parallel to the axis of said cathodes; a tuning ring axially movable with respect to said cathode and anode; and a plurality of tuning plungers corresponding to and respectively associated with said plurality of cavity resonators, mounted on said ring and axially movable therewith, each of said plungers extending into its associated cavity resonator and being urged into electrical contact with the grooved back wall thereof, each of said plungers including a flexible tungsten rod of circular cross-sectional configuration connected at one end to said tuning ring at an angle with respect to the plane thereof to flex each rod for urging the other end thereof into engagement with the back wall of its associated cavity, said rod at said other end being substantially tangent to the back wall of said cavity such that the slope of a line drawn between the point where the rod is mounted to said tuning ring and the point of tangency to the back wall of said cavity is between .060 to .035 inch per lineal inch, and a conductive flag affixed to said other end of said rod and extending radially inward toward said cathode, said flag and said rod having a cross-sectional configuration similar to and slightly smaller than the inductive portion of its associated cavity resonator whereby the tuning of the magnetron over a broad frequency band is accomplished by the ingress and egress of said conductive flags as they are moved into and out of the inductive portion of said cavity resonators by said rods.

2. The combination defined in claim 1 wherein the groove in the back wall of each of said cavity resonators is contiguous with said vanes of said resonator.

3. The combination defined in claim 1 wherein the groove in the back wall of each of said cavity resonators encompass only the central region thereof, and wherein the cross-sectional area of said rods is at least an order of magnitude smaller than the cross-sectional area of each of said cavity resonators, the radius of curvature of the groove in the back wall of each of said resonators being larger than the radius of said rods.

4. A broadband tuner for varying the resonant frequency of a multi-cavity magnetron including an anode forming a plurality of cavity resonators arranged in radial symmetry around an axially extending cathode, each of said resonators having a back wall portion remote from said cathode and grooved in a direction parallel to the axis of said cathode, said tuner comprising: a tuning member axially movable with respect to said cathode and anode; a plurality of tuning plungers corresponding to and respectively associated with the plurality of cavity resonators, connected to said member and axially movable therewith, each of said plungers extending into its associated resonator and engaging the grooved back wall thereof, each of said plungers including a flexible tungsten rod of circular cross-sectional configuration having a length at least an order of magnitude longer than its diameter, each of said rods being connected at one end to said tuning member at an angle with respect to the plane of said tuning member such that the diameter of the reference circle defined by the other ends of said rods when unflexed is larger than the diameter of the reference circle defined by the grooved back walls of the cavity resonators whereby said rods are flexed into engagement with the grooved back walls of the associated cavity resonators when said rods are inserted therein; and a copper flag affixed to the other end of said rod extending radially inward toward the cathode, said flag and said rod having a cross-section configuration which approximates the shape of the inductive portion of their associated cavity resonator to effect the tuning thereof.

5. In a multi-cavity magnetron the combination comprising: a cathode having an axis; an anode block surrounding said cathode and having a plurality of regularly spaced vanes extending therefrom toward said cathode forming a plurality of cavity resonators, each of said resonators having a grooved back wall remote from said cathode, the grooves being parallel to the axis of said cathode; and means for varying the effective inductive reactance of said cavity resonators, said means including a tuning ring axially movable with respect to said cathode and anode, a plurality of flexible rods of circular cross-section corresponding to and respectively associated with said plurality of cavity resonators, each of said rods being connected at one end to said ring and being axially movable therewith, each of said rods being flexed to permit the other end thereof to extend into its associated cavity resonator in sliding engagement with and substantially parallel to said grooved back wall thereof, each of said rods having a highly polished surface to substantially eliminate friction at the point of engagement with said back wall and having a cross-sectional area which is an order of magnitude smaller than the cross-sectional area of its associated cavity resonator, and a corresponding plurality of conductive elements affixed to said other end of said rods and extending radially inward toward said cathode, each of said elements having a cross-sectional configuration substantially filling the effective inductive portion of its associated cavity resonator.

6. The combination defined in claim 5 which further includes first and second ferromagnetic pole pieces positioned adjacent said cavity resonators on opposite sides thereof, said first pole piece being disposed between said tuning ring and said anode block and said first pole piece having a corresponding plurality of apertures formed therein in alignment with the inductive regions of said cavity resonators, said tuning rods being mounted on said tuning ring to pass through said apertures in said first pole piece.

References Cited in the file of this patent

UNITED STATES PATENTS

| | | |
|---|---|---|
| 2,408,234 | Spenser | Sept. 24, 1946 |
| 2,512,901 | Litton | June 27, 1950 |
| 2,704,337 | La Rue | Mar. 15, 1955 |
| 2,720,628 | Kumpfer | Oct. 11, 1955 |
| 2,800,609 | Litton | July 23, 1957 |
| 2,801,367 | Spenser | July 30, 1957 |